United States Patent [19]

Parras et al.

[11] 4,271,514

[45] Jun. 2, 1981

[54] LOOPBACK TEST FOR DATA TRANSMISSION PATHS

[75] Inventors: Karlheinz Parras, Nuremburg; Edgar Bader, Rückersdorf; Helmut Dupont, Eckental, all of Fed. Rep. of Germany

[73] Assignee: Te Ka De, Felten & Guilleaume, Fernmeldeanlagen GmbH, Nuremberg, Fed. Rep. of Germany

[21] Appl. No.: 70,843

[22] Filed: Aug. 29, 1979
(Under 37 CFR 1.47)

[30] Foreign Application Priority Data

Sep. 6, 1978 [DE] Fed. Rep. of Germany ....... 2838816

[51] Int. Cl.$^3$ ............................................. H04L 1/14
[52] U.S. Cl. ..................................... 371/22; 370/15
[58] Field of Search ............... 371/22; 370/15; 375/10

[56] References Cited

U.S. PATENT DOCUMENTS

| Re. 27,864 | 1/1974 | Davis et al. | 370/15 X |
|---|---|---|---|
| 3,743,938 | 7/1973 | Davis | 371/22 X |
| 3,937,882 | 2/1976 | Bingham | 375/10 X |
| 4,034,195 | 7/1977 | Bates | 371/22 |

*Primary Examiner*—David H. Malzahn
*Attorney, Agent, or Firm*—Michael J. Striker

[57] ABSTRACT

A data transmission path comprises a first and a second station, a first data transmission channel operative for synchronously transmitting data from the first to the second station in synchronism with a predetermined clocking schedule and at a respective first maximum data transmission rate, and a second data transmission channel for asynchronously transmitting data from the second to the first station at a respective second maximum data transmission rate, the first maximum data transmission rate being equal to a multiple p of the second maximum data transmission rate. A test waveform is applied to the first station for transmission to the second station along the first data transmission channel, the test waveform presenting a data transmission rate at least approximately equal to said first maximum data transmission rate. The test waveform, as received at the second station, is applied to a selector circuit whose output waveform is applied to the transmitting input of the second station for transmission back to the first station along the second channel. The selector circuit transmits to its output only every p-th one of the waveform elements applied to its input, relying on clock signals which the second station produces one per waveform element of the synchronously transmitted test waveform. The shortest waveform-element duration of the waveform produced at the output of the selector circuit at least approximately corresponds to said second maximum data transmission rate.

2 Claims, 3 Drawing Figures

LOOPBACK TEST FOR DATA TRANSMISSION PATHS

BACKGROUND OF THE INVENTION

The present invention concerns the performance of loopback tests upon data transmission paths of the type designed to synchronously transmit data in a first direction at a higher, first data transmission rate but designed to asynchronously transmit data in the opposite second direction at a lower, second data transmission rate. The intended purpose of a loopback test performed upon such a data transmission path is to generate information concerning the quality of the data transmission path.

In the case of data transmission paths operating in fully duplex manner, a loopback circuit for transmission of a test waveform can be established by transmitting the test waveform from the first or testing station in the first-direction channel to the second station, and feeding the test waveform, as received at the receiver output of the second station, back into the transmitting input of the second station for transmission back to the first or testing station via the second-direction channel of the data transmission path. Evaluation of the quality of the data transmission path constituted by the first-direction and second-direction data transmission channels, such quality evaluation involving for example criteria such as bit error rate, is then performed based upon a comparison between the test waveform as reconstituted at the receiver output of the first station and the test waveform as originally applied to the transmitting input of the first station.

The performance of such loopback test begins to be problematic when the two data transmission channels are designed for respective data transmission rates which markedly differ from each other. For example, there exist data transmission paths whose first-direction channel is designed for a maximum data transmission rate of 1200 bits/sec, but whose second-direction channel is designed for a considerably lower maximum data transmission rate of 75 bits/sec. The transmission of data via the higher-rate channel can be performed synchronously in accordance with a predetermined clocking schedule or else asynchronously. With such data transmission paths, the loopback test can only be performed using the data transmission rate of the lower-rate channel. However, this leads to the disadvantage that the higher-rate channel is not being tested under realistic conditions of operation. For example, errors of transmitted data such as would develop as the data transmission rate approaches to the maximum value for which the higher-rate channel is designed, simply do not have the opportunity to develop.

SUMMARY OF THE INVENTION

Accordingly, it is a general object of the invention to provide a method and system for performing a loopback test upon a data transmission path whose higher-rate, first-direction data transmission channel is designed for a maximum data transmission rate exceeding, by a factor of p, the maximum data transmission rate for which the lower-rate, second-direction transmission channel is designed. Furthermore, the transmission of a test waveform from the testing station via the higher-rate, first-direction transmission channel is to be synchronous and performed in accordance with a preestablished clocking schedule, whereas the transmission of a test waveform back to the testing station via the lower-rate, second-direction transmission channel is to be asynchronous.

The circuitry needed for the performance of such loopback test is to be kept very simple and is to be so designed that each of the two data transmission channels can be tested under realistic conditions of operation similar to normal use.

In accordance with the present invention, use is made of a periodic test signal. A suitable, but merely exemplary periodic test signal is the pseudorandom text proposed by CCITT recommendation V 52. This pseudorandom text has a period of 511 signal elements or unit intervals.

In accordance with the present invention, a test signal is transmitted from the first or testing station via the higher-rate, first-direction transmission channel to the second station with the maximum data transmission rate for which the first-direction channel has been designed. The thusly transmitted test signal, as reconstituted at the receiver output of the second station, is applied to a selector circuit, and the signal produced at the output of the latter is applied to the transmitting input of the second station. The selector circuit furnishes at its output only every p-th signal element or unit interval of the signal applied to its input, the well-defined signal transmitted back to the testing station via the lower-rate, second-direction transmission channel exhibiting a minumum signal element duration corresponding to the maximum rated data transmission rate for the second-direction channel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
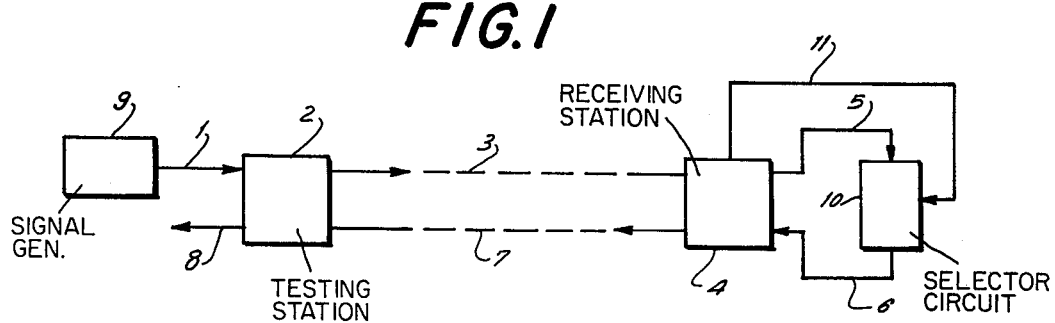
FIG. 1 schematically depicts the circuitry employed for the loopback test of the present invention.

In FIG. 1, a test signal generator 9 applies a rectangular test signal to the transmitting input of a first or testing station 2. By means of a modem, station 2 transmits the test signal via a higher-rate, first-direction transmission channel 3 having a bandwidth of for example 1.1 to 2.3 kHz to a second station 4. The higher-rate, first-direction tranmission channel 3 is designed for synchronous data transmission with a maximum data transmission rate of 1200 bits/sec. At second station 4, the received carrier is demodulated and the original rectangular test signal reproduced at the receiver output 5 of second station 4 and then applied to the input of a selector circuit 10. The clock-signal output 11 of second station 4 is connected to the clock-signal input of the selector circuit 10. The signal produced at the output of selector circuit 10 is applied to the transmitting input 6 of second station 4. Selector circuit 10 transmits to its output a signal element applied to its input at intervals of period Ta, with each thusly transmitted signal element being prolonged to a duration Ta, as described more fully below with regard to FIGS. 2 and 3. This period duration Ta corresponds to the maximum data transmission rate of the lower-rate, second-direction data transmission channel 7. Second station 4 transmits the test signal received at its transmitting input 6 back to station 2 via second-direction channel 7, the latter channel having a frequency range of 420 Hz±37.5 Hz and being designed for asynchronous data transmission with a data transmission rate of 75 bits/sec. At the receiver output 8 of first station 2, this sentback signal is reconstituted in rectangular form.

As already stated, selector circuit 10 transmits to its output only every p-th signal element of the signal applied to its input. The value of p is equal to the ratio of the maximum data transmission rate of the higher-rate channel 3 to that of the lower-rate channel 7. In the concrete example here described, $p=1200/75=16$.

For the case of data transmission paths whose first-direction and second-direction maximum data transmission rates are not thusly related by a whole-number quotient, the value of p should be so selected as to approximate as closely as possible to the maximum data transmission rate for the lower-rate channel 7.

In the concrete example here described, the test signal produced by test signal generator 9 corresponds to the pseudorandom text proposed in CCITT recommendation V 52. This text is so configured that, if one takes from the original text every 16-th signal element thereof, the resultant text is the same as the original text. The use of such a test signal has the advantage that, when monitoring the signal produced at the receiver output 8 of first station 2, use can be made of conventional, commercially available devices designed for the aforementioned CCITT text. This advantage would also hold, for example, in the case where the maximum data transmission rate for the higher-rate channel 3 were 2400 bits/sec, i.e., twice that here assumed, because if one takes from the original CCITT text in question every 32-nd signal element thereof, the resultant text is, here again, the same as the original text.

Figure 2:
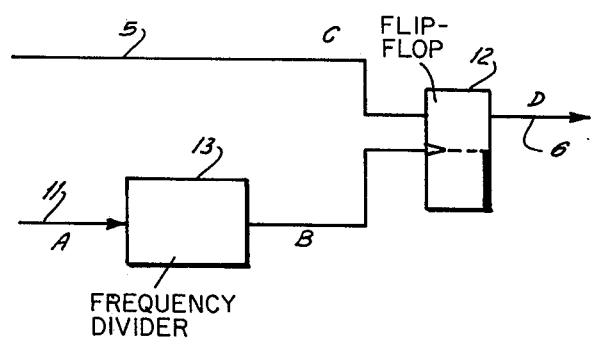
FIG. 2 depicts the configuration of the selector circuit used in FIG. 1.

FIG. 2 depicts one, and merely exemplary, configuration for the selector circuit 10 of FIG. 1; it will be noted that the terminal designations 5, 6 and 11 in FIG. 1 are repeated in FIG. 2. The exemplary selector circuit depicted in FIG. 2 comprises a flip-flop 12 whose data input is connected to the receiver output 5 of second station 4. The clock input of flip-flop 12 is connected to the output of a frequency divider 13. The input of frequency divider 13 is connected to the clock-signal output 11 of second station 4. The output of flip-flop 12 is connected to the transmitting input 6 of second station 4.

Figure 3:
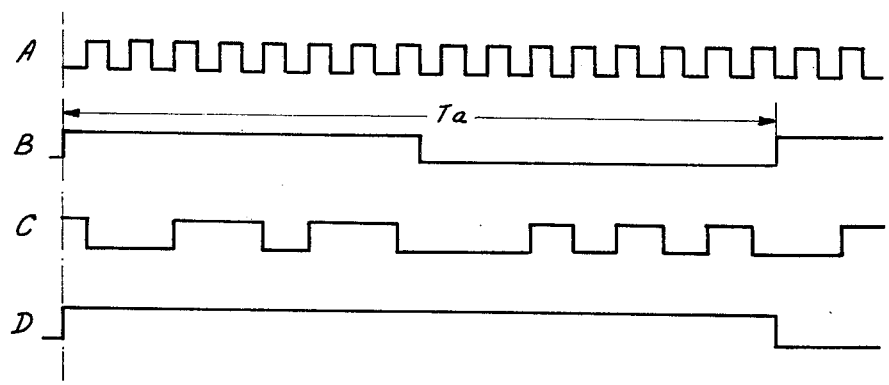
FIG. 3 depicts the four waveforms A, B, C, D present on the correspondingly denoted inputs or outputs of the circuit stages of FIG. 2.

FIG. 3, in lines A to D thereof, depicts the waveforms present at the correspondingly denoted lines of the selector circuit of FIG. 2. Line A of FIG. 3 depicts the series of clock pulses produced at the clock-signal output 11 of second station 4. The test-signal text transmitted via the higher-rate, first-direction channel 3, and reconstituted at the receiver output 5 of second station 4, is depicted in line C of FIG. 3. As will be seen by comparing lines A and C of FIG. 3, one clock pulse is generated per signal element of the test-signal text employed. The clock pulse train of line A is applied to the input of frequency divider 13. Line B of FIG. 3 depicts the output pulse train produced by frequency divider 13. The repetition frequency of the output pulse train of frequency divider 13 is lower, by a factor of $p=16$, than the repetition frequency of the clock pulse train applied to the input of frequency divider 13. Furthermore, as shown in line B of FIG. 3, the period of the output pulse train of frequency divider 13 is equal to Ta. The test-signal text depicted (only to a small extent thereof) in line C of FIG. 3 is applied to the data input of flip-flop 12. Flip-flop 12 registers only every 16-th signal element of the CCITT text employed, namely one signal element each time that the frequency-divider pulse train (line B of FIG. 3) applied to its clock input exhibits a positive-going flank. Only two positive-going flanks are depicted in the limited time interval represented in line B of FIG. 3. At the first of these two positive-going flanks, the logic level of the concurrent signal element of the CCITT text depicted in line C is a "1," in response to which flip-flop 12 assumes its "1" state, as shown in line D of FIG. 3. Flip-flop 12 remains in its "1" state, until the time of the next positive-going flank of the frequency-divider pulse train of line B. At the time of this next illustrated positive-going flank, the logic level of the concurrent signal element of the CCITT text of line C happens to be at "0", in response to which flip-flop 12 assumes its "0" state, which it retains until the time of the next (non-illustrated) positive-going flank of the pulse train of line B of FIG. 3. The interval between successive such positive-going flanks is, as indicated in FIG. 3, of duration Ta.

Thus, the rectangular waveform produced at the output of selector circuit 10 of FIG. 1 and applied to transmitting input 6 of second station 4 for transmission back to first station 2 via the lower-rate channel 7, has a signal element or unit interval duration corresponding to 75 bits/sec, i.e., corresponding to the maximum data transmission rate for the lower-rate channel 7.

The present invention is particularly advantageous in contexts where a large number of data-receiving stations are supplied with data from and to be tested from one central station. An example of such a context is a system in which a central data-supplying station supplies text to a network of display screens. In such contexts, the cost for the generation of the test waveform and for the evaluation of the quality of the transmission paths which connect the display-screen stations to the central station is confined to the central station.

Instead of the aforementioned CCITT text, the present invention can in principle be utilized with any arbitrary test pattern of periodic character, it being only necessary in such case that the transmission of the test waveform from station 2 be started at a well-defined point of the test waveform.

It will be understood that each of the elements described above, or two or more together, may also find a useful application in other types of circuits and techniques differing from the types described above.

While the invention has been illustrated and described as embodied in a particular selector-circuit configuration used in conjunction with a particular, exemplary test waveform, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In combination with a data transmission path comprising a first and a second station, a first data transmission channel operative for synchronously transmitting data from the first to the second station in synchronism with a predetermined clocking schedule and at a respective first maximum data transmission rate, and a second data transmission channel for asynchronously transmitting data from the second to the first station at a respective second maximum data transmission rate, the first maximum data transmission rate being at least several times higher than the second maximum data transmission rate, a testing system which comprises: means applying to the first station a test waveform for transmission to the second station along said first data transmission channel, the test waveform presenting a data transmission rate at least approximately equal to said first maximum data transmission rate; loopback means at the second station connected to receive the test waveform and applying a return waveform to the second station for transmission to the first station along said second data transmission channel, the loopback means including selector circuit means having an input and an output, the selector circuit means receiving the test waveform at its input and being operative for transmitting to its output only every p-th waveform element of the test waveform, p being at least approximately equal to the ratio of said first to said second maximum data transmission rate, the shortest waveform-element duration of the waveform produced at the output of the selector circuit means at least approximately corresponding to said second maximum data transmission rate.

2. The combination defined in claim 1, the second station having a receiver output at which appears the test waveform transmitted along the first data transmission channel, the second station additionally having a clock-signal output at which is produced a series of clock signals, one clock signal per waveform element of the test waveform produced at the receiver output of the second station, the second station additionally having a transmitting input for transmission of data back to the first station via the second data transmission channel, the selector circuit means comprising a flip-flop having a data input, a data output and a clock input and a frequency divider having an input and an output, the input of the frequency divider being connected to the clock-signal output of the second station for receipt of the clock signals, the output of the frequency divider being connected to the clock input of the flip-flop, the data input of the flip-flop being connected to the receiver output of the second station for receipt of the test waveform, the data output of the flip-flop being connected to the transmitting input of the second station.

* * * * *